(12) United States Patent
Becker

(10) Patent No.: US 7,689,384 B1
(45) Date of Patent: Mar. 30, 2010

(54) MANAGING THE PERFORMANCE OF AN ELECTRONIC DEVICE

(75) Inventor: Glen Alan Becker, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/731,046

(22) Filed: Mar. 30, 2007

(51) Int. Cl.
*G06F 11/00* (2006.01)

(52) U.S. Cl. .................................................. 702/188

(58) Field of Classification Search ................ 702/188, 702/179–182, 189–191, 194, 195; 709/223, 709/224
See application file for complete search history.

(56) References Cited

U.S. PATENT DOCUMENTS

| 6,038,391 | A | * | 3/2000 | Kawaba | 703/21 |
| 6,311,175 | B1 | | 10/2001 | Adriaans et al. | 706/25 |
| 6,453,269 | B1 | | 9/2002 | Quernemoen | 702/186 |
| 6,470,464 | B2 | | 10/2002 | Bertram et al. | 714/37 |
| 6,574,587 | B2 | | 6/2003 | Waclawski | 702/186 |
| 6,609,083 | B2 | | 8/2003 | Enck et al. | 702/186 |
| 6,643,613 | B2 | | 11/2003 | McGee et al. | 702/186 |
| 6,643,614 | B2 | | 11/2003 | Ding et al. | 702/186 |
| 6,691,067 | B1 | | 2/2004 | Ding et al. | 702/186 |
| 6,738,933 | B2 | | 5/2004 | Fraenkel et al. | 714/47 |
| 6,745,011 | B1 | * | 6/2004 | Hendrickson et al. | 455/67.11 |
| 6,799,154 | B1 | | 9/2004 | Aragones et al. | 703/22 |
| 6,826,575 | B1 | | 11/2004 | Waclawski | 707/102 |
| 6,876,988 | B2 | | 4/2005 | Helsper et al. | 706/21 |
| 6,917,849 | B1 | | 7/2005 | Pasadyn et al. | 700/121 |
| 6,978,259 | B1 | | 12/2005 | Anderson et al. | 706/19 |
| 7,076,397 | B2 | | 7/2006 | Ding et al. | 702/182 |
| 2002/0049687 | A1 | | 4/2002 | Helsper et al. | 706/45 |
| 2002/0069037 | A1 | * | 6/2002 | Hendrickson et al. | 702/186 |
| 2002/0133757 | A1 | | 9/2002 | Bertram et al. | 714/47 |
| 2002/0183972 | A1 | | 12/2002 | Enck et al. | 702/186 |
| 2002/0194251 | A1 | | 12/2002 | Richter et al. | 709/105 |
| 2002/0198985 | A1 | | 12/2002 | Fraenkel et al. | 714/47 |
| 2003/0036890 | A1 | | 2/2003 | Billet et al. | 703/2 |
| 2003/0065986 | A1 | | 4/2003 | Fraenkel et al. | 714/47 |
| 2003/0167151 | A1 | | 9/2003 | Ding et al. | 702/186 |
| 2003/0225877 | A1 | | 12/2003 | Packman et al. | 709/224 |
| 2004/0122647 | A1 | * | 6/2004 | Monroe et al. | 703/22 |
| 2004/0133395 | A1 | | 7/2004 | Ding et al. | 702/182 |
| 2005/0097207 | A1 | | 5/2005 | Gluhovsky et al. | |

(Continued)

OTHER PUBLICATIONS

Foxon, T. et al., "Capacity planning in client-server systems," *Dist. Syst. Engng.*, 1996, 3, 32-38.

(Continued)

*Primary Examiner*—Michael P. Nghiem
*Assistant Examiner*—Cindy H Khuu
(74) *Attorney, Agent, or Firm*—Brooks, Cameron, & Huebsch, PLLP

(57) ABSTRACT

A performance management system and method for generating a plurality of forecasts for one or more electronic devices is presented. The forecasts are generated from stored performance data and analyzed to determine which devices are likely to experience performance degradation within a predetermined period of time. A single forecast is extracted for further analysis such that computer modeling may be performed upon the performance data to enable the user to predict when device performance will begin to degrade. In one embodiment, graphical displays are created for those devices forecasted to perform at an undesirable level such that suspect devices may be subjected to further analysis.

18 Claims, 8 Drawing Sheets

U.S. PATENT DOCUMENTS

| | | |
|---|---|---|
| 2005/0102175 A1 | 5/2005 | Dudat et al. |
| 2005/0169186 A1 | 8/2005 | Qiu et al. ................... 370/242 |
| 2005/0278703 A1 | 12/2005 | Lo et al. ................... 717/126 |
| 2006/0013134 A1 | 1/2006 | Neuse ....................... 370/230 |
| 2006/0020866 A1 | 1/2006 | Lo et al. ................... 714/741 |
| 2006/0020923 A1 | 1/2006 | Lo et al. ................... 717/127 |
| 2006/0020924 A1 | 1/2006 | Lo et al. ................... 717/127 |
| 2006/0117059 A1* | 6/2006 | Freeman et al. ............ 707/102 |
| 2007/0005297 A1 | 1/2007 | Beresniewicz et al. |
| 2007/0061450 A1* | 3/2007 | Burnley et al. ............. 709/224 |
| 2008/0184262 A1 | 7/2008 | Ginis et al. |

OTHER PUBLICATIONS

Meyer, B. et al., "Defining Policies for Performance Management in Open Distributed Systems," *DFG*, 1994, 10 pages.

Norton, T., "Simalytic Hybrid Modeling: Planning the Capacity of Client/Server Applications," *Draft for IMACS World Congress 1997*, 1996, 1-12.

* cited by examiner

MANAGING THE PERFORMANCE OF AN ELECTRONIC DEVICE

CROSS-REFERENCE TO RELATED APPLICATIONS

This application is related by subject matter to the inventions disclosed in the following commonly assigned applications, the entirety of which are hereby incorporated by reference herein: U.S. patent application Ser. No. 11/731,073, U.S. patent application Ser. No. 11/731,050, and U.S. patent application Ser. No. 11/731,044, each filed on Mar. 30, 2007 and each entitled "Managing the Performance of an Electronic Device." This application is related to U.S. patent application Ser. No. 10/672,005 filed on Sep. 26, 2003 now U.S. Pat. No. 7,110,913.

BACKGROUND OF THE INVENTION

Managing a computer system which includes a plurality of devices such as networks or servers, is of special interest to data processing or information technology personnel. Such computer systems typically include a plurality of diverse devices including memory, disks, local area network (LAN) adaptors and central processing units (CPUs) which interact in various ways to facilitate data processing applications.

As systems become larger and more complex, interactions between electronic devices become harder to define, model, and/or predict. Such systems may suffer from inefficiencies or "bottlenecks" that slow or even stop the system.

Often, the performance of a computer system or network is less than it could be because of one or more components having an inappropriate load applied thereto. Thus, it is desirable to know what changes to the system would be required in order to improve capacity of each electronic device. Further, such changes would allow the manipulation of a preset number of electronic devices instead of the system as a whole. To accomplish this, there remains a need for a system and method capable of collecting and analyzing performance data such that it may be utilized to predict future performance of individual electronic devices.

SUMMARY OF THE INVENTION

Embodiments are directed to improving the management of performance issues related to electronic devices, such as a plurality of servers. Irrelevant data may be disregarded or eliminated to improve interpretation of data related to the network of servers. Additionally or alternately, linear models may be implemented in analyzing the data.

These and other features described in the present disclosure will become more fully apparent from the following description and obtained by means of the instruments and combinations particularly pointed out in the appended claims, or may be learned by the practice of the systems and methods set forth herein. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings.

DETAILED DESCRIPTION OF ILLUSTRATIVE EMBODIMENTS

The present invention is herein described as a method of managing one or more electronic devices and as a computer system for managing one or more electronic devices.

Figure 1:
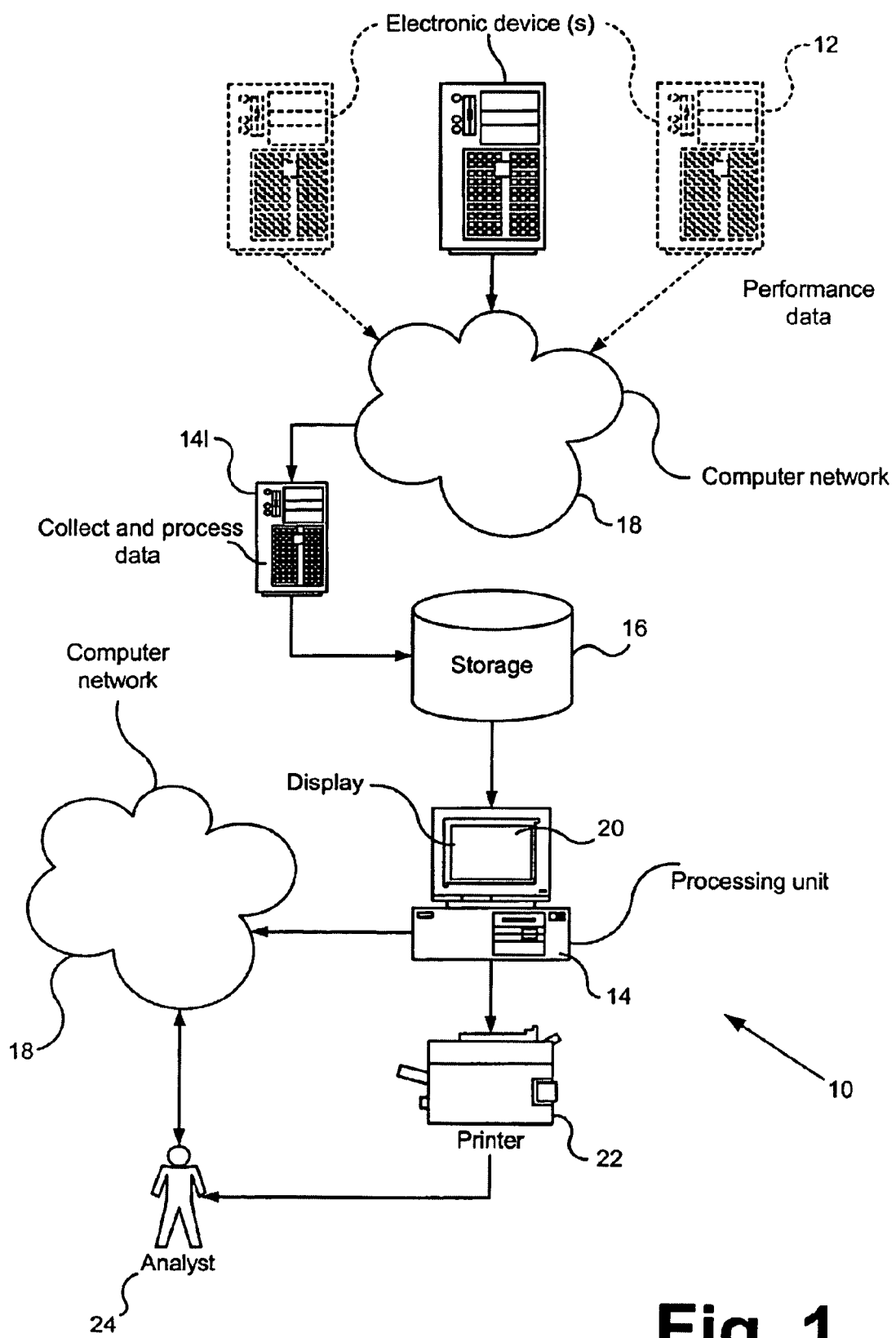
FIG. 1 is a component diagram of one embodiment of the present invention.

Referring to FIG. 1, the computer system 10 of the present invention is capable of receiving and analyzing data from any number of electronic devices 12. In one embodiment, data describing the performance of such devices is collated and processed by an intermediate processing unit 141 prior to the storage of the data upon a storage device 16.

In another embodiment, performance data is fed through a computer network for storage upon the storage device. In this embodiment, the data is collated and processed by a central processing unit 14 coupled to each electronic device, as well as the computer network.

In one embodiment, the processing unit 14 of the present invention is equipped with a graphic display interface 20 capable of providing graphical displays of analyzed performance data, as discussed further below.

In one embodiment, the results of analysis performed by the processing unit may be sent either to a printer 22 for the creation of hard copy reports, or electronically to one or more analysis personnel 24. In one embodiment, such analyzed information may be transmitted through one or more computer networks 18. Further, the reporting capabilities of the present invention allow this system to provide the analyst with analysis summaries. This feature of the present invention provides the analyst with an overview of one or more of the electronic devices at issue, in order to allow the analyst to make an informed decision regarding which devices require attention.

For the purposes of illustration only, in one embodiment, the present invention may be utilized to determine when to upgrade an Intel® server, such as a Compaq® Pentium II® having a quad processor running at 333 MHz. A performance data collection tool residing on the server, Best 1 for example, is capable of capturing performance data every few seconds. Data is then sent to an IBM R/S 6000 midrange server, via a local area network (LAN), where it is collected and processed. A batch job is then run, using SAS® Proc Reg for example, which appends the data into a database stored on a storage area network (SAN). The data may then be gathered from the SAN and analyzed according to the present invention using, for example, a Dell® Desktop computer having a Pentium IV® processor operating at 1.7 GHz. Capacity charts may be displayed on the computer's monitor, sent to a printer, and/or stored electronically on the SAN.

Figure 2:
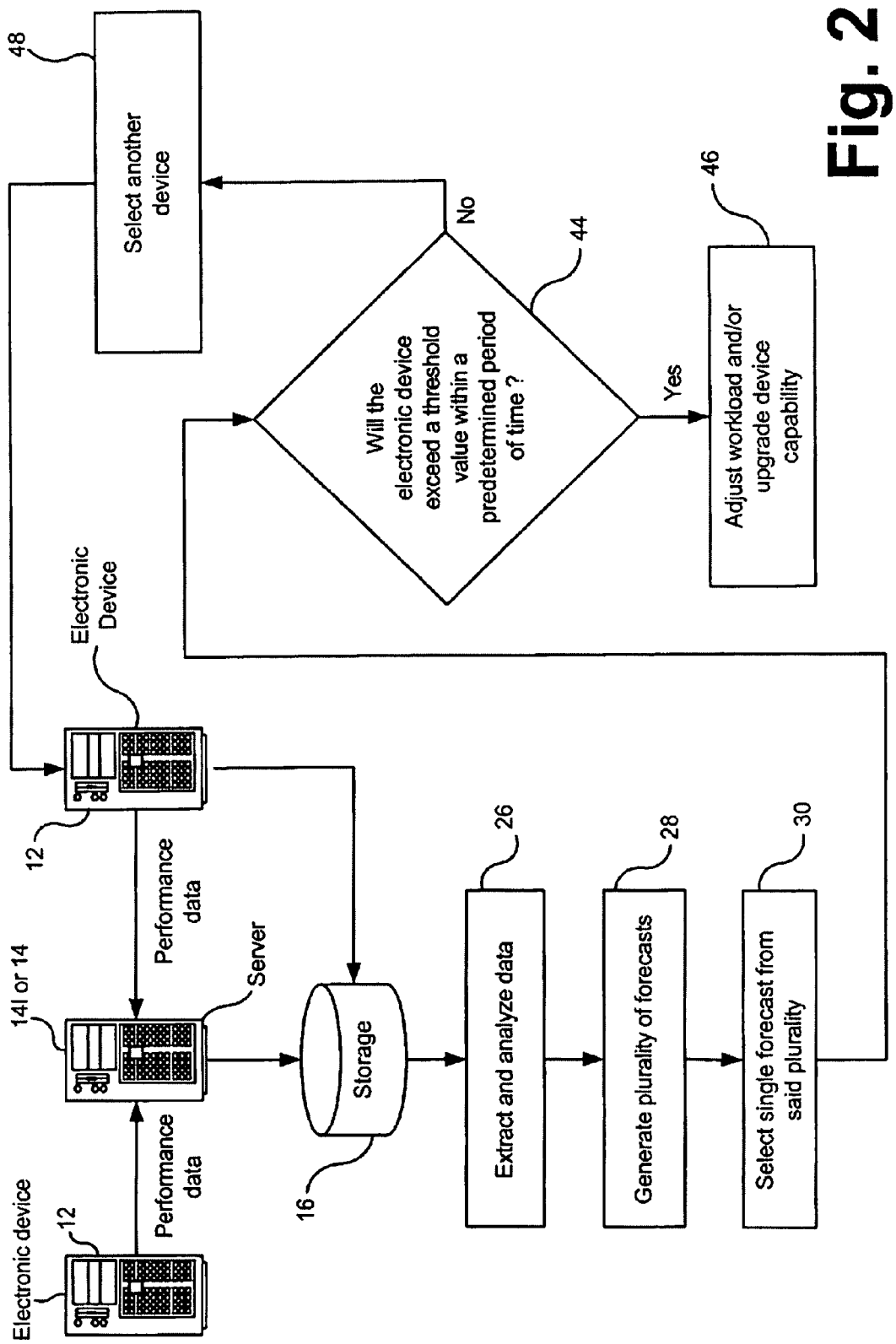
FIGS. 2, 3, 5, and 6 are process flow diagrams illustrating various embodiments of the present invention.
Figure 3:
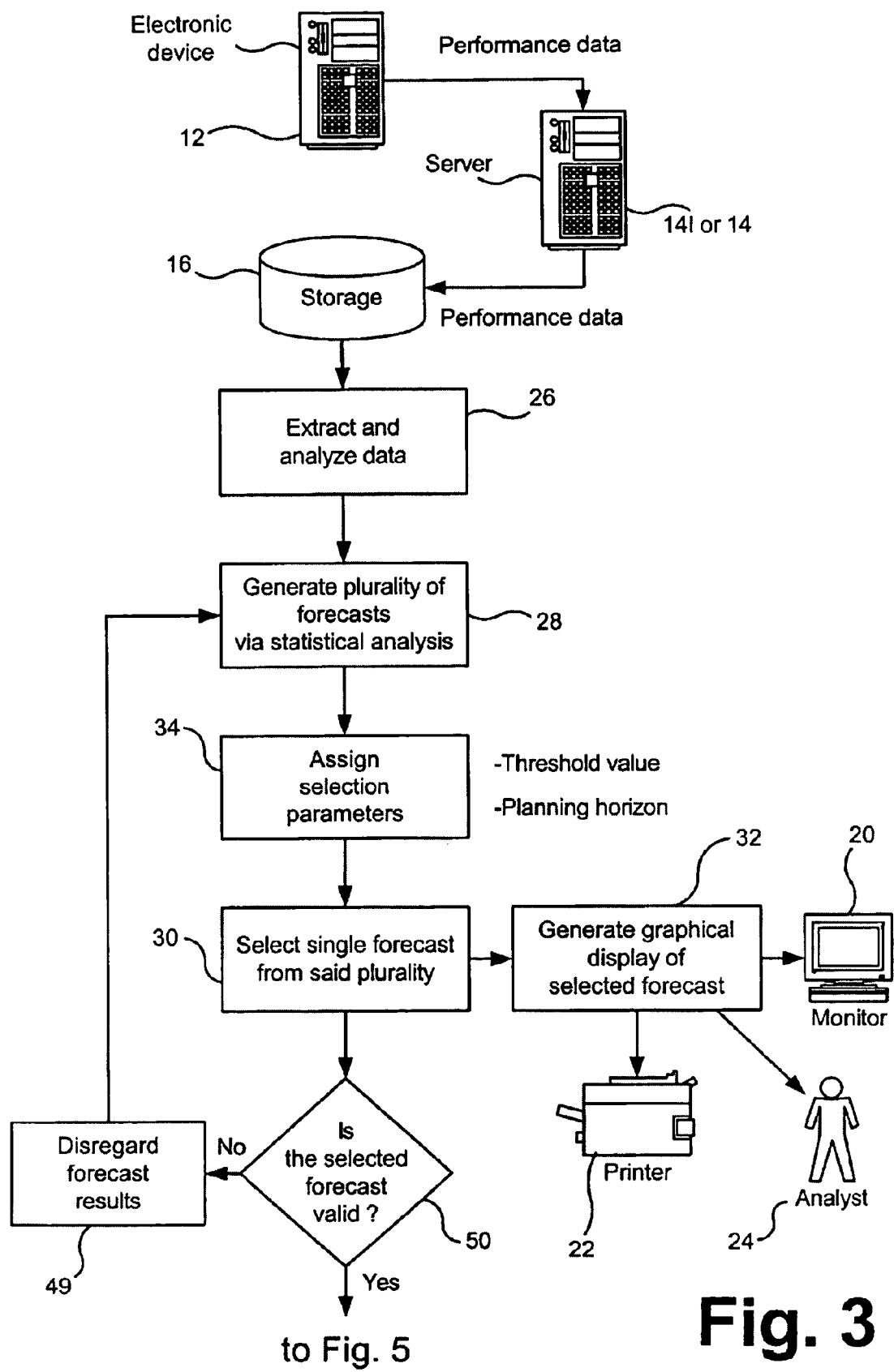

Referring to FIGS. 2 and 3, the present invention is capable of collecting data from a host of electronic devices in order to determine potential performance degradation over time. Referring to box 26, the present invention extracts and analyzes performance data held upon a storage device 16. In one embodiment, performance data is collected and analyzed by an intermediate processing unit 141, described above. During processing, the data may be formatted such that it may be analyzed by any number of known statistical analysis systems. In one embodiment, performance data is analyzed by Statistical Analysis System® (SAS) software capable of applying a host of statistical procedures and data management tools.

Such statistical analysis systems are utilized by the present invention to generate a plurality of forecasts relating to the performance of one or more electronic devices. In one embodiment, the present invention is utilized to analyze one or more servers such that a plurality of forecasts may be generated for each one, as illustrated by box 28.

The present invention may utilize any number of known statistical methods, in order to generate a plurality of forecasts for each device. In one embodiment, the system 10 of the present invention generates graphical displays of each forecast for review by the user, as illustrated by box 32. In one embodiment, such displays may be used to provide the user with an overview of a device's capacity as well as fluctuations over any given period of time.

Figure 4:
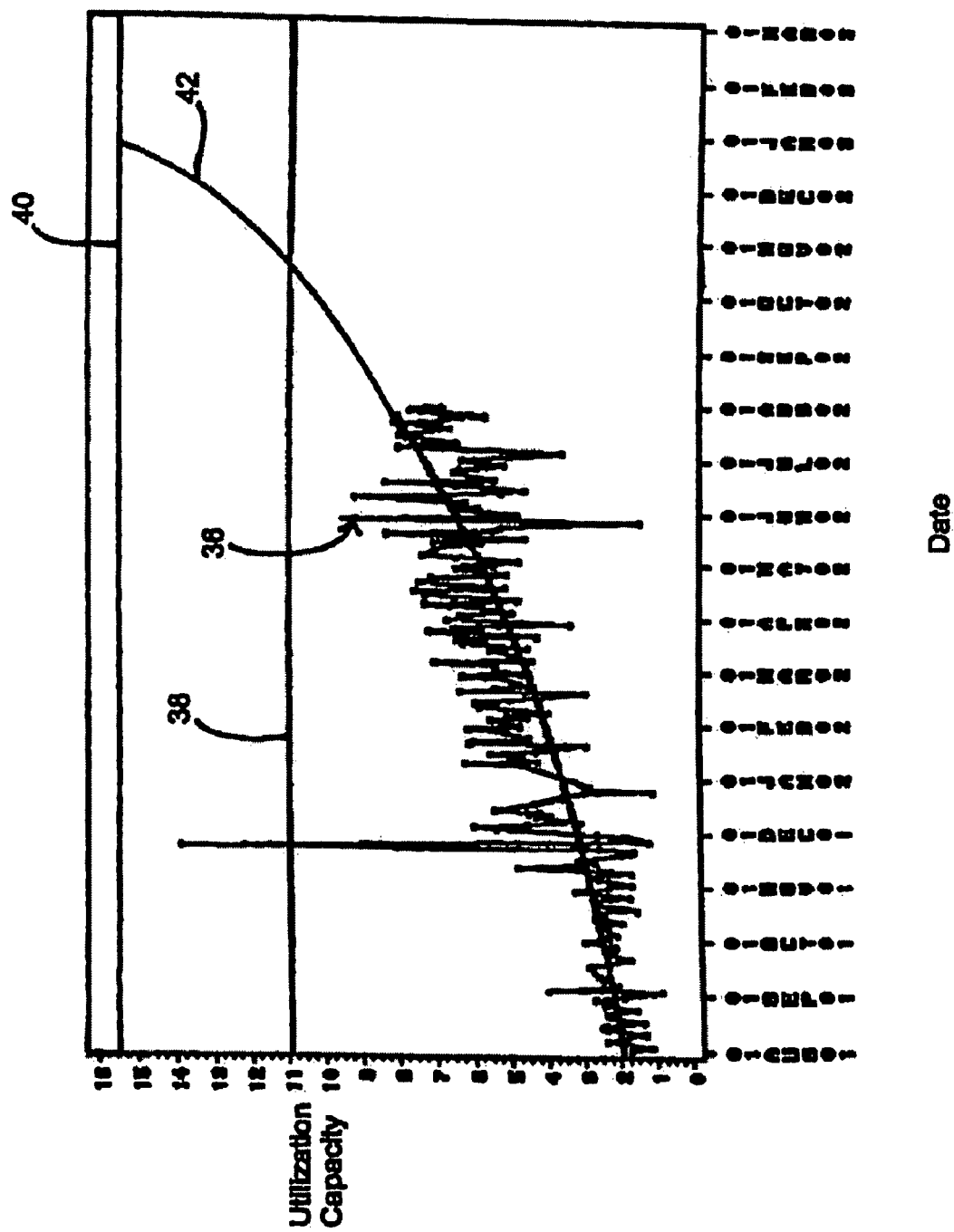
FIG. 4 is a graphical display illustrating the data modeling and analysis process of one embodiment of the present invention.

The processing unit 14 of the computer system 10 of the present invention selects a single forecast from the plurality of forecasts generated, as illustrated by box 30. In one embodiment, this is accomplished via the assignment of selection parameters by the user or analyst, as illustrated by box 34. These parameters may consist of a threshold value relating to the device data being analyzed or a predetermined time period. For example, the graphical display of FIG. 4, illustrates "device capacity" on the Y-axis, and "time" on the X-axis. In this example, a capacity threshold of 11 SPECint95, an industry standard performance benchmark, has been selected in order to enable the system to readily ascertain capacity readings above this threshold value. By setting such a threshold value, the user may instruct the system to single out forecasts showing capacity readings above or below a preset figure. In one embodiment, the threshold value is determined to be the point at which the capacity of the device or devices in question begin to degrade. In another embodiment, a threshold capacity of 70% measured in relation to the maximum capacity of the device is utilized.

Multiple selection parameters may be assigned to enable the system to single out individual forecasts having particular attributes. For example, if the user assigns a capacity threshold of 11 SPECint95 and a planning horizon of January, 2003, the graphical display of FIG. 4 would be flagged by the system such that further review may be conducted by an analyst. Specifically, the selected capacity of 11 SPECint95 is forecasted to exceed prior to the planning horizon date of January, 2003. Thus, further review of the device at issue is warranted, given the selection parameters.

Figure 5:
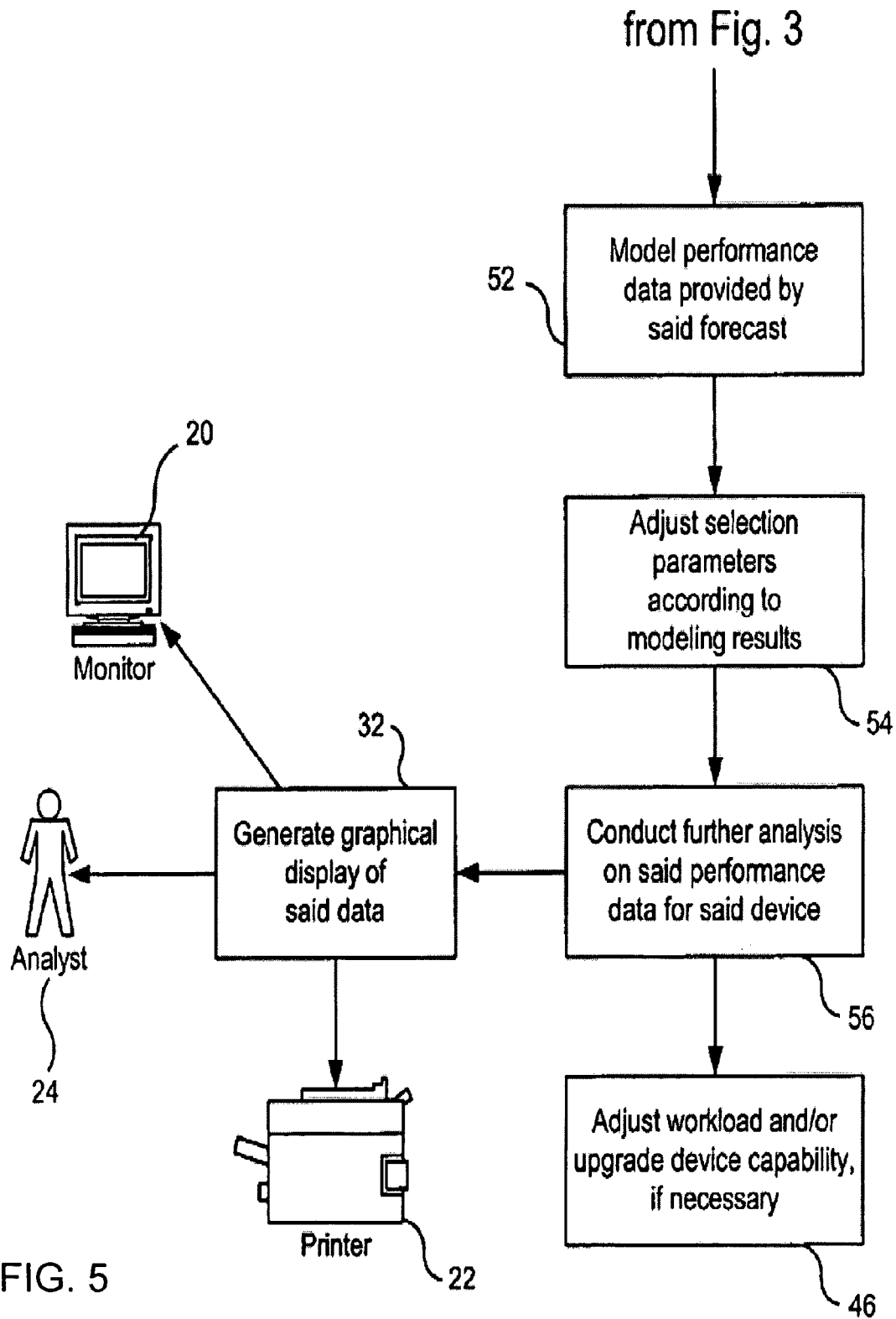
Figure 6:
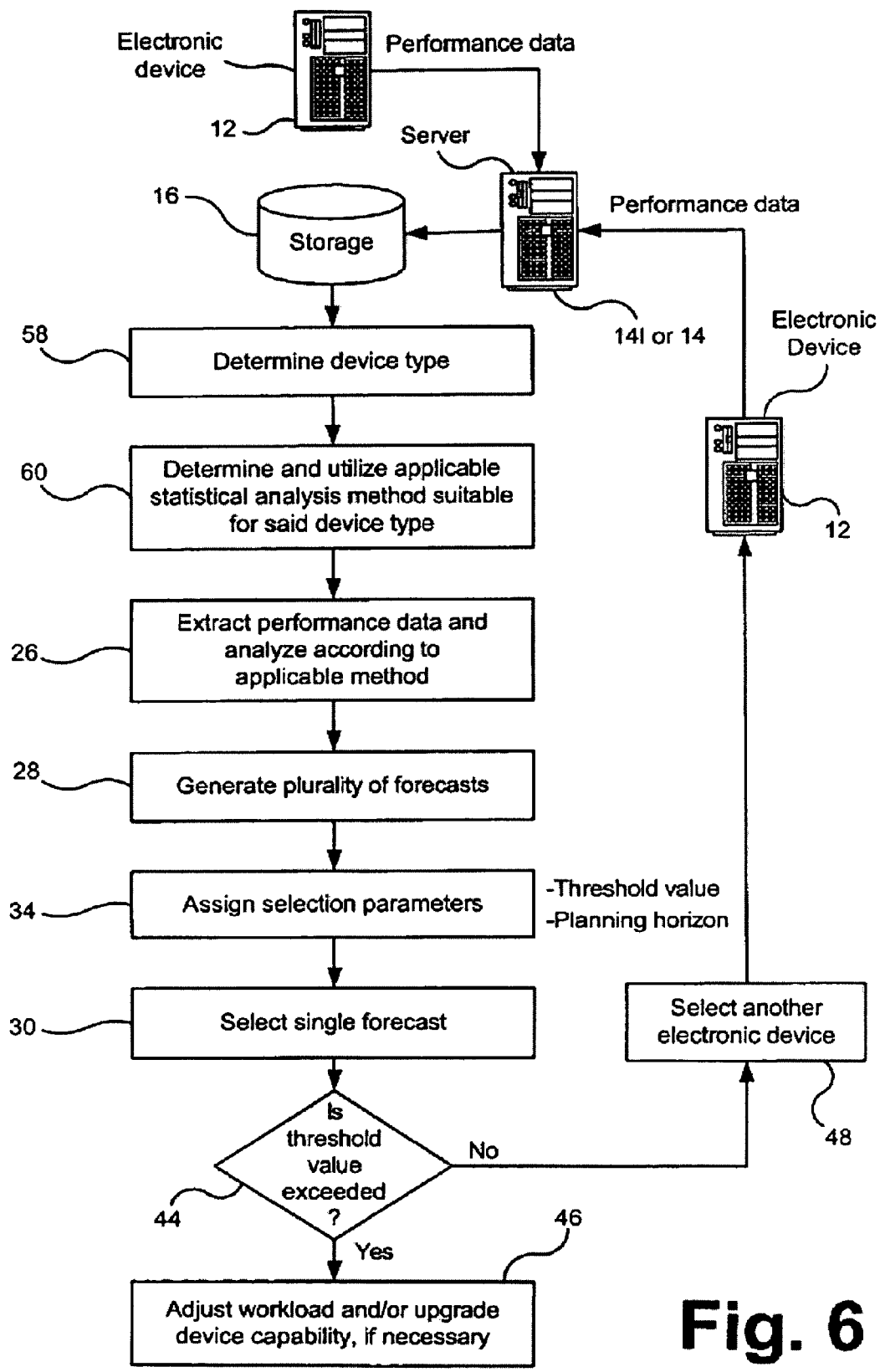

FIG. 4 graphically illustrates the actual capacity data 36, the selected capacity threshold 38, the total capacity 40, and the forecasted performance of a device 42 in light of collected performance data. In one embodiment, the planning horizon is chosen based on the estimated time it would take to repair and/or upgrade the device at issue. Further, in one embodiment, the single forecast selected by the system is the most conservative forecast relating to the device upon which statistical analysis has been performed. Thus, the present invention allows the user to save time and effort by reviewing only those forecasts indicating an urgent need for review, as illustrated by boxes 44 and 46 of FIGS. 5 and 6. This process may then be repeated for additional individual devices or an aggregate of devices, as illustrated by box 48.

Data modeling for the purpose of generating forecasts, as illustrated by box 52, is well known in the art. For the purposes of the present invention, any reasonable linear or non-linear statistical model (such as a polynomial or an exponential model) may be utilized to forecast when the capacity threshold of an electronic device will be exceeded. In one embodiment, a log-linear model is utilized because it provides conservative forecasts for many electronic devices. In many cases, the resource consumption growth of an electronic device will behave in a log-linear fashion. Thus, for many electronic devices, the log-linear model provides the most accurate forecasting results.

This model takes the form of $Y=Ac^{Bx}$, where Y is the actual capacity consumed, X is the time or date of consumption, c is the rate of exponential change, and A and B are model parameters to be estimated from the data. One may assume any value for c, or, in one embodiment, estimate the value of c from actual data. However, in this example, c is taken to be 2.71828.

In one embodiment, the forecasting procedure utilized by the present invention for this example model begins by converting the exponential model to natural logarithms, i.e., Ln Y=Ln A+Bx, and then utilizing linear regression to determine estimates of Ln A and B. In order to determine an estimate for Y, the present invention calculates $e^{Ln\ A+Bx}$ by replacing Ln A and B with their respective estimates. The use of linear regression is well known in the art and is available in many statistical analysis computer packages.

For the data shown in the example of FIG. 4, the estimate of Ln A equals −59.46628, and the estimate of B equals 0.00396. For example, if the date x is taken to be Aug. 1, 2001, the estimated capacity consumed would equal 1.97. Thus, the value of x utilized by the example of FIG. 4 is 15,188, which is the number of days from Jan. 1, 1960, to Aug. 1, 2001. As mentioned above, models different from the exponential method described above would require different methods for estimating the model parameters. It being understood that the present invention is capable of utilizing any of such statistical models during the analysis process.

Forecasting techniques may be applied either to peak, average, ninety-fifth percentile, minimum, or any other chosen statistic in order to provide a statistical confidence interval for each forecast. Further, the present invention may be applied to software applications executed by one or more electronic devices. In one embodiment, forecasts may be sorted by date in order to inform the user or administrator which device(s) require the most immediate attention. Further, each forecast may be reviewed and validated by one or more analysts familiar with the device at issue, as illustrated by box 50. In some cases, the analyst agrees with the forecasted data and begins an upgrade and/or adjustment of the device to prevent performance degradation. In other cases, forecasted data may be in error such that the analyst recommends that the forecast be disregarded, as illustrated by box 49.

Subsequent to the review of the selected forecasts by the analyst, the selection parameters discussed above may be adjusted according to the modeling results, as illustrated by box 54. Further, the statistical analysis methodology utilized by the present invention may be adjusted based upon the knowledge and experience of the analyst with respect to the device at issue. In one embodiment, additional statistical analysis as illustrated by box 56 is conducted utilizing adjusted selection parameters to create a subsequent graphical display for further review by the analyst, as illustrated by box 32. Different types of electronic devices may require different statistical analysis methodologies. For example, if the user desires to analyze a large system comprising a plurality of different types of devices, the planning horizon and threshold capacity would require adjustment. Further, the statistical methods utilized for each type of device may require adjustment in order to produce the most conservative forecast results. For example, a first statistical analysis method may take all of the input data into account such that each data point is weighted equally. However, a second data analysis technique may weigh the most recent data points more heavily, depending on which technique is being utilized. Thus, depending on the type of statistical analysis technique employed, the forecasted results will change accordingly.

In one embodiment, the present invention allows the user to choose from a host of statistical analysis methods complete with explanation as to what device types are most suited for each of said statistical analysis methods. Further, in one embodiment, the present invention provides the analyst with guidelines regarding the time required to upgrade/adjust various types of electronic components. This feature of the present invention allows the analyst to easily choose his or her selection parameters, thus providing the analyst or other user with enhanced efficiency and ease of use.

Further, the processing unit of the present invention is capable of determining the device type based upon the format of the data collected and stored upon the storage device, as illustrated by box 58. In one embodiment, the metadata characteristics of the performance data for each electronic device is utilized by the processing unit to determine the type of device at issue. Once the device type has been ascertained, the system is capable of automatically, or through manual direction, selecting and utilizing the most appropriate statistical analysis method and/or selection parameters suitable for the device type at issue, as illustrated by box 60. The above analysis process may then be repeated utilizing the methods/parameters best suited to the device(s) at issue.

It should be understood that the present invention is not relegated to the use of capacity data or any other particular number or type of device, as in the above example. On the contrary, the present invention may utilize any metric, or combination of metrics, such as intensities, in place of or in addition to system utilization data. For example, electronic device usage may fluctuate according to traffic and/or maintenance patterns. The present invention allows the analyst to adjust the forecasting results to compensate for peak and off-peak workload patterns, as well as maintenance or resource allocation procedures. This information may be stored on the storage device for use in conjunction with performance data collected from the device(s) during statistical analysis. Further, such information, through the display and reporting capabilities of the present invention, may assist the analyst in consolidating and/or adjusting workload or load balancing parameters.

This feature of the present invention is particularly useful when applied to a large number of electronic devices undergoing aggregate statistical analysis. Specifically, selected forecasts maybe aggregated in order to present the analyst with a performance overview of analyzed devices working in combination. This allows the analyst to conduct load balancing and/or consolidate workloads over multiple devices. The reporting capabilities described above may be utilized to provide the analyst with best and/or worst case forecasts designed to provide an overall "level of confidence". In one embodiment, this is accomplished through graphical and/or textual display of performance data.

The collection of data from the electronic devices 12, and the subsequent statistical analysis and forecast generation to predict performance of the electronic devices 12, may include irrelevant data. Use of irrelevant data may cause a user to make incorrect and/or inaccurate adjustments and/or upgrades to the electronic devices 12.

The irrelevant data may originate from a variety of sources and/or means. For example, initial data from a device 12 upon the initiation or start-up of the device 12 may not accurately reflect the use of the device 12. The start-up data may be misinterpreted as data that accurately portrays the use of the device 12, while the data may not actually be a real portrayal of the operation of the device 12. A predefined number of days may be identified as a means for eliminating the initial, perhaps irrelevant data. For example, data collection may begin after the first 30 days of operation of a device 12. Other time periods may instead be used and defined based upon criteria. For example, a user may know from past experience that data collection after 15 days of operation accurately reflects the device's operation.

Figure 7:
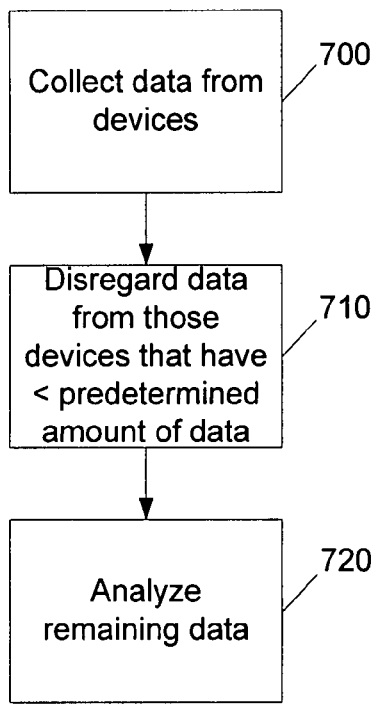
FIG. 7 is a flow diagram of an example method of data analysis.

FIG. 7 is a flow diagram of an example method of data analysis. At 700, data is collected from the devices. The data from devices that do not have a certain amount of data (e.g., devices that have been operating less than a certain number of days, a device that is idling, a device whose utilization is under five percent, etc.) is disregarded, at 710. Then, at 720, the data that remains is analyzed. In this manner, only the data that was collected from the devices that are considered to be relevant is analyzed, thereby avoiding the use of irrelevant or inaccurate data, such as the data generated during a device start-up period.

Irrelevant data may also originate from using data from both before and after an upgrade in the statistical analysis and forecast generation. The pre-upgrade data may indicate one trend, while the post-upgrade data may indicate a completely different or unrelated trend. The two distinct trends may cause a user to misinterpret the operation of the device 12. When an upgrade occurs, the pre-upgrade data may be disregarded in the subsequent analysis. Additionally, the post-upgrade data may be disregarded for a predefined period of time, such as 30 days since the device upgrade, for example. Additionally, if a 2 for 1 or better upgrade occurred, desirably only those data points since the upgrade are considered. This eliminates comparison of pre- and post-upgrade data, which otherwise may be misinterpreted as very rapid growth.

Additionally, criteria may be used to define whether a device upgrade or downgrade is substantive. For example, a minor or spurious change to a hardware table that assigns power ratings to a device may be disregarded, thereby eliminating false device upgrades or downgrades. Such minor or spurious changes can be caused by temporary errors in assigning a power rating to a device, or by the common practice of moving a physical processor from one device to another for very short periods of time. Thus, for example, short-lived capacity changes may be eliminated.

Figure 8:
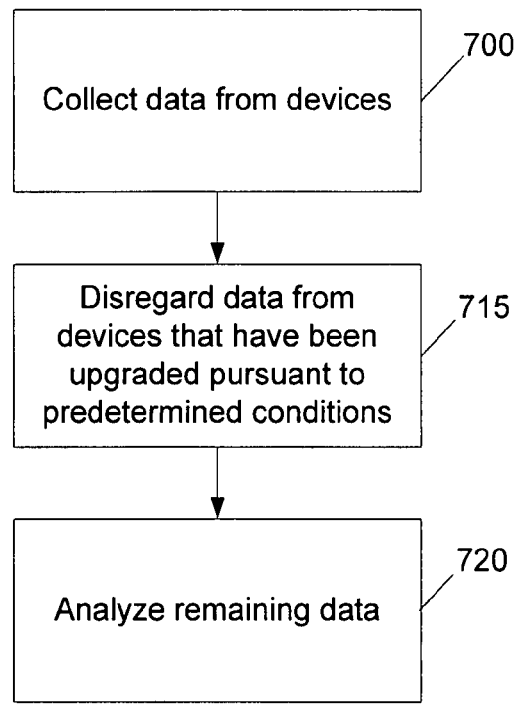
FIG. 8 is a flow diagram of another example method of data analysis.

FIG. 8 is a flow diagram of another example method of data analysis. Steps 700 and 720 are similar to those described above with respect to FIG. 7. Data is collected from the devices, at 700. The data from devices that have been upgraded (or downgraded) in accordance with certain conditions is disregarded (e.g., pre-upgrade data is disregard, data from the first 15 days after an upgrade is disregarded, etc.), at 715. Then, at 720, the data that remains is analyzed. In this manner, for devices that were upgraded (or downgraded), only post-upgrade data or certain post-upgrade data, is considered to be relevant and is analyzed, thereby leading to more accurate analysis and results.

A retired device may be defined as a device 12 not utilized in a predefined period of time. A retired device may be determined to provide irrelevant data. If a device 12 is determined to be a retired device, then the data from the device 12 may not be used in the statistical analysis and forecast generation.

Desirably, a minimum number of data points and/or a predetermined probability of model significance for the device is also met in order for a device model to be used. For example, set a minimum of five data points and a 50 percent probability of model significance (e.g., as measured by the "F" statistical test) for a model to be accepted. This eliminates spurious models that predict fiction.

Figure 9:
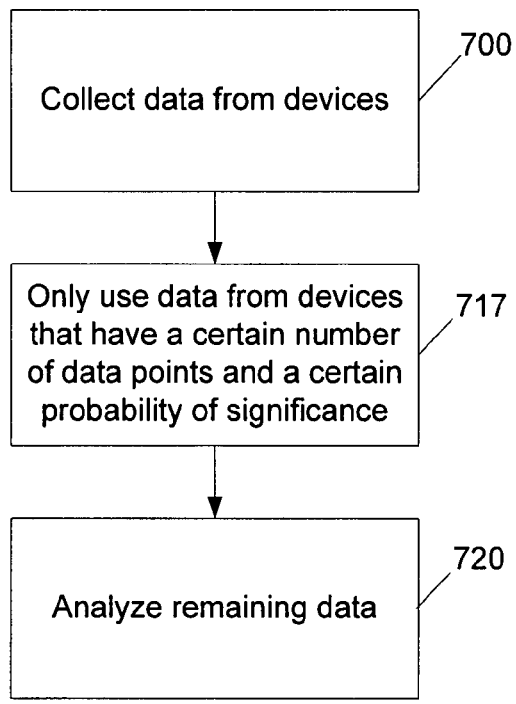
FIG. 9 is a flow diagram of another example method of data analysis.

FIG. 9 is a flow diagram of another example method of data analysis. Steps 700 and 720 are similar to those described above with respect to FIG. 7. As above, data is collected from the devices, at 700. However, at 717, only the data is used from devices that have at least a certain number of data points (e.g., five) and/or a certain probability of significance (e.g., 50 percent, using a predetermined statistical test). Then, at 720, the data from these devices is analyzed.

Figure 10:
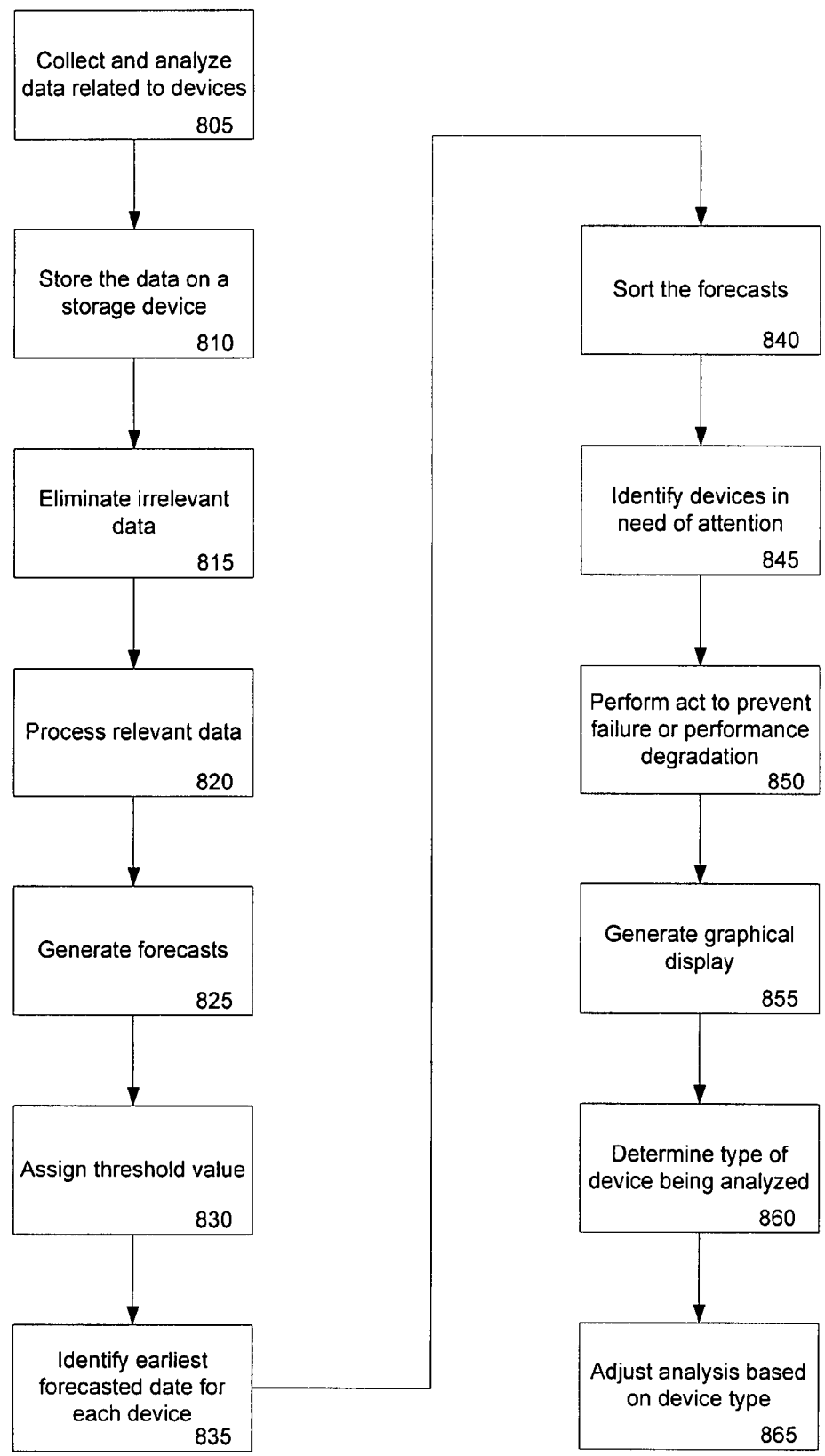
FIG. 10 is a flow diagram illustrating an example method of managing a group of electronic devices.

FIG. 10 is a flow diagram illustrating an example method of managing a group of electronic devices 12. At 805, data relating to the devices 12 is collected and analyzed. The data may be historic resource utilization data and may, for example, represent a load placed on a set of finite resources over a specified and predefined period of time. At 810, the data is stored on a storage device, such as the storage device 16.

At 815, irrelevant data, such as that described above, is eliminated from the stored data. Irrelevant data may include data collected prior to a predefined time period. Alternately or additionally, irrelevant data may include data collected prior to an upgrade performed on one of the devices 12. Or the irrelevant data may be data that is collected from a device 12 deemed to be a retired device.

At 820, after the irrelevant data is eliminated so as not to be considered in the subsequent analysis, the relevant data may be processed. At 825, forecasts may be generated. The forecasts may include one or more resource utilization forecasts for each device 12. At 830, a threshold value may be assigned. The threshold value may be used to identify devices 12 whose forecasted resource utilization exceeds the threshold value within the predefined period of time. At 835, for each device 12, the earliest forecasted date that the threshold will be exceeded is identified. Then at 840, the various forecasts are sorted by the identified dates. At 745, the device or devices 12 that are in need of immediate and prompt attention in order to prevent a failure or performance degradation are identified. At 850, an act to prevent the failure or performance degradation is performed. The act may be performing an additional analysis related to the devices 12. The act may alternately or additionally include the adjustment of the workload and the capability of the devices 12.

At 855, a graphical display of one or more of the forecasts may be generated. The forecast may represent an acceptable level of performance degradation associated with the electronic devices 12.

Furthermore, at 860, a device type of the electronic device 12 being analyzed may be determined. The device type may dictate the need for a certain type of analysis. For example, certain analyses may be inapplicable for certain devices. At 865, the statistical analysis may be adjusted and/or changed depending on the device type.

As mentioned above, while exemplary embodiments of the invention have been described in connection with various computing devices, the underlying concepts may be applied to any computing device or system. Thus, the methods and systems of the present invention may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the invention.

As is apparent from the above, all or portions of the various systems, methods, and aspects of the present invention may be embodied in hardware, software, or a combination of both.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A method of managing a group of electronic devices, the method comprising:
   providing a processor for:
      receiving historic resource utilization data from the group of electronic devices, wherein the group of electronic devices comprises a group of servers;
      identifying irrelevant data for each of the electronic devices from the received historic resource utilization data, wherein data is identified to be irrelevant when a probability of model significance pertaining to the associated server is less than a predetermined threshold;
      removing irrelevant data from the historical resource utilization data prior to analyzing the historical resource utilization data; and
      analyzing the remaining data.

2. The method of claim 1, wherein the historic resource utilization data is based on the load placed on the servers during a predefined period of time.

3. The method of claim 1, wherein data is identified to be irrelevant based on the amount of data received from each electronic device.

4. The method of claim 1, wherein data is identified to be irrelevant when one or more of the following conditions is present: the data is older than a certain value, the data is from a first predetermined number of days of operation of a corresponding electronic device, or the data is from a time period when a corresponding electronic device was idling.

5. The method of claim 1, wherein data is identified as irrelevant when one or more of the following conditions is present: the data is from a retired server, the data is received from a server that has a utilization under a predetermined amount, the data occurred prior to an upgrade to a server, or the data occurred within a predetermined amount of time after the upgrade to the server.

6. The method of claim 1, wherein the probability of model significance is determined by the F statistical test.

7. A computer-readable medium having computer-readable instructions executable by a processor, the computer-readable instructions comprising instructions for:

receiving historic resource utilization data from the group of electronic devices, wherein the group of electronic devices comprises a group of servers;

identifying irrelevant data for each of the electronic devices from the received historic resource utilization data, wherein data is identified to be irrelevant when a probability of model significance pertaining to the associated server is less than a predetermined threshold;

removing irrelevant data from the historical resource utilization data prior to analyzing the historical resource utilization data; and analyzing the remaining data.

8. The computer-readable medium of claim 7, wherein the historic resource utilization data is based on the load placed on the servers during a predefined period of time.

9. The computer-readable medium of claim 7, wherein data is identified to be irrelevant based on the amount of data received from each electronic device.

10. The computer-readable medium of claim 7, wherein data is identified to be irrelevant when one or more of the following conditions is present: the data is older than a certain value, the data is from a first predetermined number of days of operation of a corresponding electronic device, or the data is from a time period when a corresponding electronic device was idling.

11. The computer-readable medium of claim 7, wherein data is identified as irrelevant when one or more of the following conditions is present: the data is from a retired server, the data is received from a server that has a utilization under a predetermined amount, the data occurred prior to an upgrade to a server, or the data occurred within a predetermined amount of time after the upgrade to the server.

12. The computer-readable medium of claim 7, wherein the probability of model significance is determined by the F statistical test.

13. A system comprising a processor for:

receiving historic resource utilization data from the group of electronic devices, wherein the group of electronic devices comprises a group of servers;

identifying irrelevant data for each of the electronic devices from the received historic resource utilization data, wherein data is identified to be irrelevant when a probability of model significance pertaining to the associated server is less than a predetermined threshold;

removing irrelevant data from the historical resource utilization data prior to analyzing the historical resource utilization data; and analyzing the remaining data.

14. The system of claim 13, wherein the historic resource utilization data is based on the load placed on the servers during a predefined period of time.

15. The system of claim 13, wherein data is identified to be irrelevant based on the amount of data received from each electronic device.

16. The system of claim 13, wherein data is identified to be irrelevant when one or more of the following conditions is present: the data is older than a certain value, the data is from a first predetermined number of days of operation of a corresponding electronic device, or the data is from a time period when a corresponding electronic device was idling.

17. The system of claim 13, wherein data is identified as irrelevant when one or more of the following conditions is present: the data is from a retired server, the data is received from a server that has a utilization under a predetermined amount, the data occurred prior to an upgrade to a server, or the data occurred within a predetermined amount of time after the upgrade to the server.

18. The system of claim 13, wherein the probability of model significance is determined by the F statistical test.

\* \* \* \* \*